Figure 1:
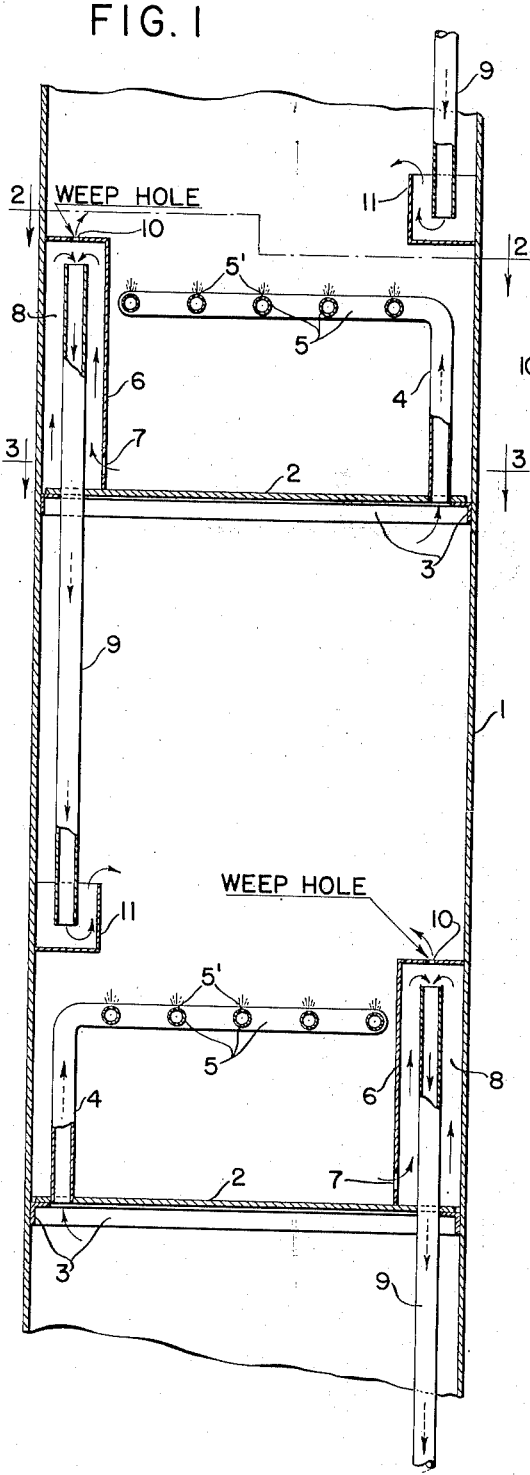

INVENTOR
JAMES R. STRONG

Patented Dec. 30, 1952

2,623,813

UNITED STATES PATENT OFFICE 2,623,813

APPARATUS FOR LIQUID-LIQUID CONTACTING

James R. Strong, Crawfordsville, Ind., assignor to Universal Oil Products Company, Chicago, Ill., a corporation of Delaware Application August 16, 1950, Serial No. 179,828

4 Claims. (Cl. 23—270.5)

This invention relates to improved means for effecting the countercurrent contacting of fluid streams, particularly the liquid-liquid contacting of immiscible streams having different densities. An improved deck or tray construction is provided which substantially prevents emulsions, that are normally formed at a contacting deck, from passing downwardly through the downspout means, to thus form an improved tower which in turn effects more efficient multiple stage liquid-liquid contacting.

In treating towers, scrubbing or wash towers, and the like, where liquids contact one another in countercurrent flow, the conventional perforated trays or bubble cap type of contacting decks, as well as other types in general use, have a construction which utilizes a relatively low weir or baffling means communicating with the downspout means, such that relatively large amounts of emulsion, formed above the contacting deck by the countercurrent liquid flow, is permitted to pass downwardly through the downspout to a next lower deck. In other words, the lighter or lower specific gravity liquid is carried downwardly through the downspout, and thorough mixing with efficient separation of the immiscible liquids is not effected, so that the relatively light material passes continuously upwardly through the column and the relatively heavy material continuously downwardly therethrough.

It is a principal object of the present invention to provide a contacting deck suitable for use in a liquid-liquid processing or treating tower, which is effective in countercurrently mixing the liquid streams at each deck, and at the same time provides for the continuous downward flow of the relatively heavy liquid material without carrying any substantial quantities of emulsion resulting above the contacting deck.

It is a further object of the present invention to provide an improved contacting deck construction, suitable for liquid-liquid contacting, having a relatively high weir means above the deck plate and means for enclosing the weir so that there is a substantially complete separation of the immiscible liquids from the zone where the emulsion is formed and the relatively heavy liquid medium is permitted to pass downwardly without carrying any appreciable amounts of the lighter liquid medium.

In a broad aspect, the improved contacting tray, which is adapted for use in a treating or processing tower having countercurrent movement of liquid streams, comprises in combination, an imperforate deck plate adapted to extend substantially horizontally across the contacting tower, rising liquid conduit means extending from the underside of the deck plate to a fluid distributing header extending across the tower at a spaced distance above the deck plate, the distributing header having a plurality of jets or a multiplicity of fluid distributing orifices so that the relatively light material may be mixed with the downwardly moving relatively heavy material, partitioning means forming a confined descending liquid receiving section extending a spaced distance above the deck plate and having fluid inlet means therein above the surface of the deck plate, and open-ended downspout means extending from the upper portion of the descending liquid receiving section through the deck plate to a point of discharge a spaced distance therebelow.

Where a plurality of the contacting trays are used one above another in a vertically disposed contacting tower, the open lower end of the downspout means is spaced at least a short distance above the fluid distributing header of the next lower deck so that an efficient mixing and countercurrent contacting of the upwardly and downwardly moving liquid mediums may be accomplished above each deck tray. Each distributing header of each contacting deck is also spaced a short distance above the deck plate so that a separation space is permitted for the separation of emulsion which may be formed by the countercurrent contacting at each distributing header. It is also a feature of the present invention to have the downspout means for the relatively heavy liquid housed within a baffled zone forming a relatively confined liquid receiving chamber or section so that there is a substantially complete separation of the relatively light and relatively heavy liquid components above the deck plate and adjacent the normal emulsion zone. Further, the inlet opening to the downspout means is maintained at a relatively high level above the deck plate in the receiving section so that very little if any emulsion is carried downwardly through the downspout means to a next lower deck.

The improved contacting tray of this invention may be utilized in all types of liquid-liquid contacting towers and is not limited to any one operation or treating process. For example, the improved tray may be used in a caustic treating tower, wherein gasoline is passed upwardly and countercurrently to a caustic treating material comprising sodium hydroxide, potassium hydroxide, or the like, with or without solutizers such as methanol, cresols, etc. In another instance, the deck may be used in a wash tower wherein water passes countercurrently to a mixture of alcohol and naphtha. Many other types of liquid-liquid contacting operations are carried out in similar towers and are known to those familiar with the chemical and processing arts.

The construction and operation of the present improved deck will be more apparent, and additional features noted, by reference to the accompanying drawing and following description thereof.

Figure 1 of the drawing is a sectional and elevational view of a portion of a vertically disposed contacting tower with the improved contacting decks therein.

Figure 2:
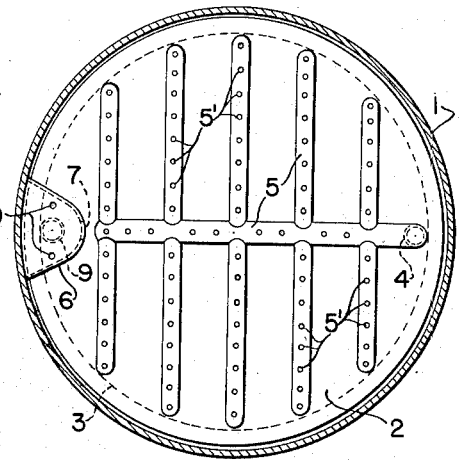

Figure 2 of the drawing is a sectional plan view above one of the contacting decks being viewed from above its fluid distributing header, as indicated by line 2—2 in Figure 1 of the drawing.

Figure 3:
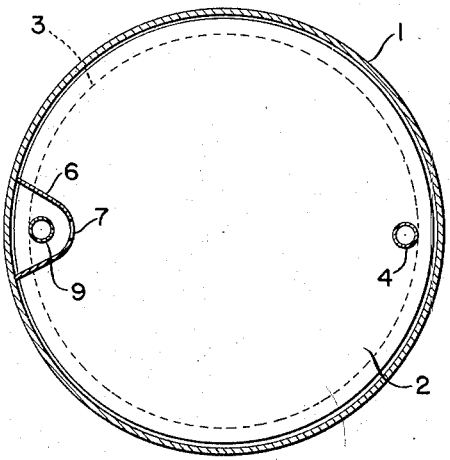

Figure 3 of the drawing is a sectional plan view of the lower portion of the tray, at a level just above the deck plate, as indicated by line 3—3 in Figure 1 of the drawing.

Referring now to the drawing, there is indicated a portion of a vertically disposed chamber 1, which is adapted to maintain a plurality of spaced contacting decks or trays suitable for effecting liquid to liquid contacting between substantially immiscible fluid streams, one of the streams being a relatively light liquid medium and one being a relatively heavy liquid medium, so that there is a displacement or gravity flow maintained to effect a continuous countercurrent contacting of the liquid mediums. Each of the spaced contacting trays has a deck plate 2, which extends substantially horizontally across the tower 1, being either welded to the inside wall of the chamber or attached to suitable supporting and holding members, such as ring angles 3, which in turn are attached to the wall of the chamber 1. Each deck plate 2 is imperforate having only openings therethrough to accommodate one or more risers 4 which connect to a liquid distributing header 5. The distributing header 5, in the present drawing, has a plurality of pipe-like members extending each way from a central member, and each member has a multiplicity of perforations or orifices 5' directed upwardly, so that the relatively light liquid medium is distributed uniformly across the entire cross-sectional area of the chamber 1. However, it is not intended to limit this portion of the contacting apparatus to any one particular design or form of distributing header for obviously other types or forms of headers may well be used to effect the desired distribution of the liquid medium.

The distributing header 5 is spaced well above the upper surface of the plate or deck 2, in order that the emulsion or mixture of the relatively heavy liquid medium, descending through the tower, and the relatively light liquid medium, distributed through the header 5, has a zone for separation below the level of the distributing header 5. The relatively heavy liquid medium which descends to the top of the deck plate 2 enters a confined liquid receiving section as provided by the baffling or partitioning 6, having in turn one or more inlet openings 7 which are spaced but a short distance above the upper surface of the deck 2. The liquid inlet openings 7 may be at the surface of the deck, but, are preferably spaced thereabove a short distance, in order to permit the settlement of sludge or solid matter on the upper level of the deck 2, without effecting a blocking of the inlet openings. Primarily, only the heavier of the liquid mediums enters the inlet port 7 and rises within the receiving zone 8 to the open upper end of the downpipe 9. However, a small amount of the relatively light liquid medium may enter the receiving zone 8, in mixture with, or in an emulsion with the heavier component, and pass upwardly to the upper portion of the receiving zone, in which case it may be passed on upwardly through one or more suitable weep-holes 10 in the top end of the receiving chamber. Thus, only the relatively heavy liquid medium passes downwardly through the downspout pipe 9 to contact the relatively light liquid medium at the next lower deck.

In a preferable construction, the lower end of the downpipe 9 terminates in a seal cup or tray 11, which also aids in distributing the liquid at a level which is a short distance above the inlet end of the next lower downpipe, as well as above the distributing header 5, so that the heavy liquid medium is in each case discharged within the contacting column above the zone where the relatively light liquid medium is uniformly distributed and uniform mixing is accomplished to effect the desired treating, washing, etc. Also, the liquid receiving zone 8 as formed by the baffling 6, as well as the upper end of the downpipe 9, extends to a level which is substantially as high, or slightly higher than the positioning of the distributing head 5. This construction insures the substantially complete separation between the light and heavy liquid components, while the extended upper portion of the downpipe 9 in the receiving section 8 is equivalent to a high weir which prevents any emulsion, which may enter into the liquid receiving zone, from passing downwardly to the next lower deck.

To illustrate a specific operation, let it be assumed that gasoline is to be treated with a caustic solution to effect the substantial removal of organic acid materials and/or mercaptans. The caustic solution may comprise sodium hydroxide, potassium hydroxide or the like, alone or with a solutizer such as methanol, etc., which effects an increase in the solubility of the mercaptans in the caustic solution. In a continuous countercurrent flow, the gasoline to be treated is introduced into the lower portion of the treating tower 1 and is subsequently withdrawn from the upper portion of the chamber, while the caustic is introduced into the upper end of the chamber and is withdrawn as spent material from the lower portion thereof. This spent material normally is passed to suitable regeneration equipment to recover the caustic for reuse in the process. The gasoline and caustic liquid mediums are substantially imiscible with one another and are of substantially different specific gravities or densities, so that a gravity displacement of the heavier caustic material downwardly through the column continuously moves the gasoline upwardly therethrough and a continuous countercurrent flow is effected.

At each of the contacting trays, the relatively light gasoline is passed upwardly through the riser line 4 and through the distributing header 5 so that it is distributed uniformly across the entire horizontal area of the chamber 1 and bubbles are sprayed upwardly through the descending relatively heavy caustic medium. The vertical spacing between contacting trays, provides for the substantial separation of the two liquid mediums after their contacting and mixing at the zone of the distributing head. In other words, primarily only the lighter gasoline passes to the upper portion of the space between decks or deck plates, so that gasoline with very little if any caustic passes from the underside of each deck plate 2 upwardly through the riser line 4 to the distributing header 5. The gasoline upon being sprayed through orifice 5' into and mixing with the heavier caustic material, passing downwardly from the downpipe 9, forms an emulsion-like mixture to effect the desired intimate contacting of the two liquid mediums. This emulsion remains primarily within the zone of the distributing header 5, for the heavier caustic passes to the lower portion of the space, or to the zone just above the deck plate 2, while the contacted gasoline rises to the upper portion of the space just below the deck plates 2 of the next higher tray.

In accordance with the improved method of passing the heavier liquid medium downwardly through the tower, the caustic enters the inlet openings 7 and passes upwardly through the liquid receiving section 8 to the upper and inlet end of the downpipe 9. Thus, the baffling or partitioning 6 in effect provides, together with the upper extended portion of the downpipe 9 above the deck plate 2, a liquid seal so that the emulsion formed by the mixing of the gasoline and caustic is substantially prevented from entering the upper end of the downpipe means and passing downwardly to a next lower deck to provide an inefficient operation. As hereinbefore noted, the positioning of the inlet opening 7 at a point just above the deck plate 2 insures that primarily only the relatively heavy liquid medium is taken into the receiving zone 8, however, where some emulsion is passed into that zone, the vertical elongated form of zone 8 provides for further separation of the emulsion and the relatively light gasoline may be permitted to pass upwardly through the end of the zone by means of the weep holes 10, and thus carry upwardly to the next higher deck rather than be carried downwardly to a next lower deck in entrainment with the caustic material.

The present contacting apparatus in effecting an efficient contacting of the countercurrently flowing liquid mediums, and more particularly in effecting an efficient separation of the mediums prior to the downward movement of the relatively heavy medium, permits the use of a lesser number of contacting decks within a given treating tower. There is thus a considerable saving in the overall use of such contacting devices in a contacting tower, considering both the first cost and maintenance. Still further, the construction of each contacting tray itself is relatively simple and of an inexpensive nature, with the use of a simple pipe-type of distributing means in lieu of the multiplicity of bubble caps or other rising liquid distributing means, while the enclosed liquid receiving chamber for the relatively heavy liquid medium may be formed by curved baffles or plates such as 6, without the necessity of any elaborate form of construction. The construction of the contacting apparatus may of course be varied in that more than one riser line 4 may be used to connect with the distributing header means, while at the same time a plurality of downpipes 9 may be utilized to extend downwardly from an enlarged liquid receiving zone 8. The number of risers or downpipes, as well as their size, will of course depend upon the size of the treating tower and the quantity of liquid mediums to be handled in the countercurrent treating operation. Also, the number of contacting decks used in any given tower depends upon the number of stages of countercurrent contact between the liquid mediums necessary to effect the degree of treating or washing desired, but, in view of the increased efficiency of mixing and separating a lesser number of stages are required for any one operation, in comparison to the aforementioned conventional types of trays.

I claim as my invention:

1. An apparatus for contacting liquids comprising a contacting tower, an imperforate deck plate extending across the tower, a fluid distributing header disposed horizontally in the tower a substantial distance above the deck plate, a vertical riser line connecting the underside of said plate with said header, means forming a liquid receiving chamber on the deck plate adjacent the inner wall of the tower, said means comprising a vertical partition extending upwardly from the deck plate and having an opening therethrough near said plate, and an open-ended conduit extending from the upper portion of said chamber through the deck plate to a point in the tower below the deck plate.

2. The apparatus of claim 1 further characterized in that said chamber extends from the deck plate to a level above said distributing header.

3. The apparatus of claim 1 further characterized in that said header comprises a plurality of horizontal pipes having spaced orifices in their upper portions.

4. An apparatus for contacting liquids comprising a contacting tower, an imperforate deck plate extending across the tower, a fluid distributing header disposed horizontally in the tower a substantial distance above the deck plate, a vertical riser line connecting the underside of said plate with said header, a vertical partition extending upwardly from the deck plate and having an opening therethrough near said plate, a horizontal partition extending from the upper portion of the vertical partition to the inner wall of the tower and having a weep-hole therethrough, said partitions forming with the inner wall of the tower a chamber for receiving liquid from the deck plate, and an open-ended conduit extending from the upper portion of said chamber through the deck plate to a point in the tower below the deck plate.

JAMES R. STRONG.

REFERENCES CITED

The following references are of record in the file of this patent:

UNITED STATES PATENTS

| Number | Name | Date |
| --- | --- | --- |
| 1,684,489 | Halloran | Sept. 18, 1928 |
| 2,020,009 | Zeitler | Nov. 5, 1935 |
| 2,215,359 | Livingston | Sept. 17, 1940 |